UNITED STATES PATENT OFFICE.

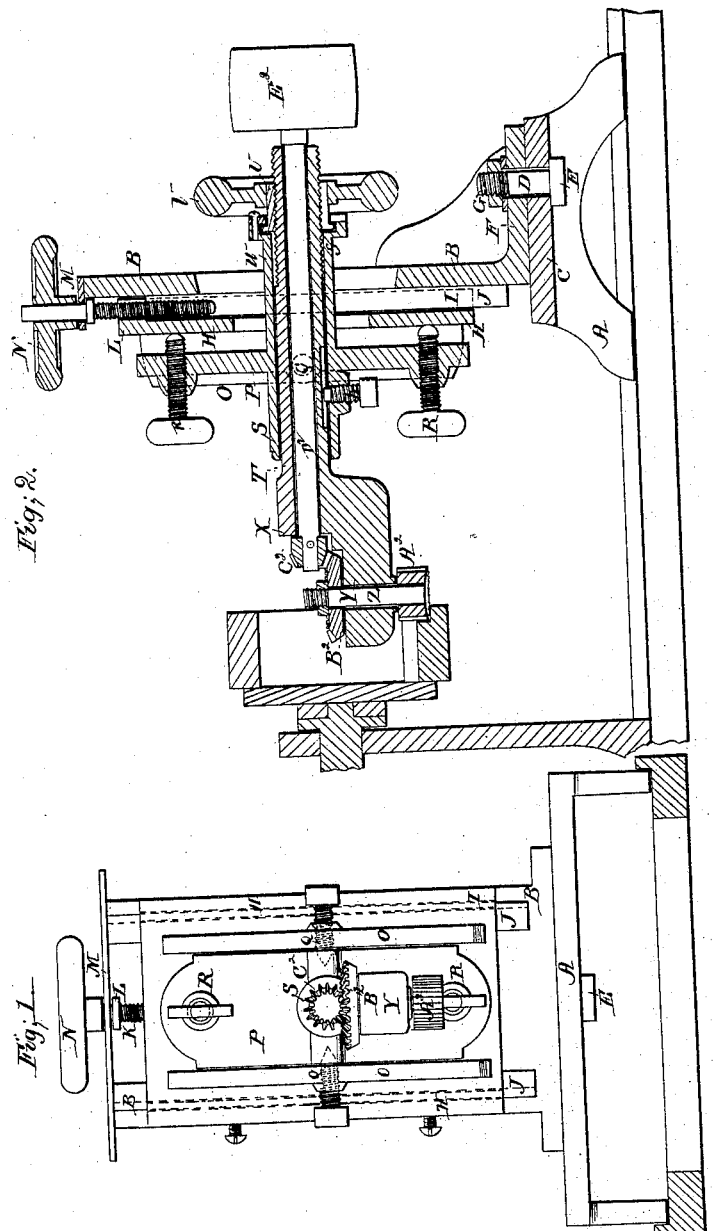

JOHN K. DIRNER, OF HONESDALE, PENNSYLVANIA.

IMPROVEMENT IN MACHINERY FOR CUTTING KEY-SEATS.

Specification forming part of Letters Patent No. 58,076, dated September 18, 1866.

*To all whom it may concern:*

Be it known that I, JOHN K. DIRNER, of Honesdale, Wayne county, State of Pennsylvania, have invented new and useful Improvements in Machines for Boring or Cutting Key-Seats; and I do hereby declare that the following is a full, clear, and exact description thereof, which will enable others skilled in the art to make and use the same, reference being had to the accompanying drawings, forming part of this specification.

The present invention relates to new and useful improvements in machines for the turning, boring, or cutting of key-seats in car-wheels, cranks, and other portions of machinery; and it consists in a novel manner of arranging the cutting-tool, whereby the tool can be so adjusted or set in position and so regulated as to cut a key-seat with an inward or outward incline, or in a parallel line with the central axis of the car-wheel, crank, or other device in connection with which it is being used, as will be apparent from the following description thereof, reference being had to the accompanying plate of drawings, in which—

Figure 1 is an end view of the carriage having the cutting-tool for key-seats arranged on it, according to the present improvements, which carriage is to be used upon any of the ordinary turning-lathes suitable for the turning or boring of metals; Fig. 2, a central vertical section taken in the plane of the line *x x*, Fig. 1, in the direction of the length of the carriage.

A in the drawings represents a carriage such as are now in use in lathes, the construction of which is, however, different in the present instance, as will be apparent from the description following, to accommodate the peculiar manner of arranging the cutting-tool embraced by the improvements herein specified. This carriage A is set upon the bed of the lathe, and is moved toward or away from the face-plate of the lathe in the ordinary manner for such carriages, the article to be bored or have a key-seat formed in or on it being secured to such face-plate in any suitable manner.

B is a vertical frame or plate secured on upper side of bed-plate C of carriage A by means of a bolt, D, having a head upon its lower end, and passing loosely up through the bed-plate C and plate F of frame B, with a screw thumb-nut, G, upon its upper end.

On the front side of vertical frame B a plate, H, is placed, fitting by the flanges I upon its two sides over the vertical parallel dovetail flanges J J of the frame B, to raise and lower which plate H a vertical screw-shaft, K, is employed, screwing into the lug L at the upper end of the plate H, and passing loosely through the top strip or piece, M, of the frame B, with a suitable disk, N, upon its upper end, for convenience in turning it.

O O are two parallel projecting lips of the front side of the plate H, extending in a vertical direction thereon, between which lips a vertical plate, P, is hung, and balanced upon the inner ends of set-screws O of the said lips, one upon each side of the plate P.

R R are two set-screws, one passing through the upper end of plate P, and the other through the lower end of the same, both screws coming to a bearing against the front face of the plate H, to which such plate is hung, so that by properly turning the said set-screws the plate P can be adjusted or set to any desired vertical inclination with regard to the length or direction of the plate H, to which it is hung, for a purpose to be hereinafter specified.

From each side of the plate P, in a horizontal plane and in a direction at right angles to its length, extends a hollow sleeve or tube, S, passing through the central open or cut-away portions of both the plate H and frame B. Through this hollow sleeve or tube S extends a concentric hollow shaft or spindle, T, the rear end of which for a portion of its length has a screw-thread formed around it, over which is a screw-nut, U, in the center of a concentric disk or wheel, V. This screw-nut U is so secured to outer end, W, of hollow sleeve S, as plainly shown in Fig. 2 of the drawings, that while it can freely turn around by the turning of the wheel in which it is secured, as explained, or forms a part, it cannot move in a lateral direction either way from or toward the said sleeve, thus, as is obvious, moving the screw-shaft, with the teeth of which the screw-nut is interlocked, as described, in or out of the sleeve S, in which it is placed.

The end X of hollow spindle or shaft T has a horizontal projecting arm, Y, in which turns a vertical shaft, Z, projecting from the upper and lower sides of the same, with a cutting-tool, $A^2$, upon its lower end and a horizontal bevel-gear wheel, $B^2$, upon its upper, with the teeth of which is interlocked a vertical bevel-gear wheel, $C^2$, upon one end of a shaft, $D^2$, passing loosely through the center of hollow spindle T, from the opposite end of which it projects, with a pulley, $E^2$, on such end, around which an endless belt is to be passed, connecting it with the driving-shaft of the lathe or the driving-power used.

From the above description of the construction and arrangement of the various parts it is plain to be seen that, by properly adjusting the set-screws of the plate P, the cutting-tool can be made to cut any desired incline of key-seat in the device desired, be it a car-wheel or crank, which incline may either extend outward or inward, the tool being fed up to its work by properly turning the wheel therefor, the distance to which the key-seat is cut being limited by the length of the slot $a$ in the hollow spindle T, with which is engaged the set-screw $b$ of the hollow sleeve secured to the swinging plate P.

By changing the cutting-tool and substituting another of a larger or smaller diameter, it is obvious that a key-seat can be cut of a greater or less width.

I claim as new and desire to secure by Letters Patent—

The spindle X, in combination with the plate P, pivoted to the flanges O, and adjusted by set-screws R R, constructed and arranged substantially as described, for the purpose specified.

JOHN K. DIRNER.

Witnesses:
H. DOLMETSCH,
HERMANN FISHER.